(12) United States Patent
Sung et al.

(10) Patent No.: US 10,290,896 B2
(45) Date of Patent: May 14, 2019

(54) METHOD OF MANUFACTURING SULFIDE-BASED SOLID ELECTROLYTE THROUGH WET PROCESS

(71) Applicant: Hyundai Motor Company, Seoul (KR)

(72) Inventors: Ju Young Sung, Hwaseong-si (KR); Ho Taek Lee, Seoul (KR); Jae Min Lim, Suwon-si (KR); Yong Jun Jang, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 109 days.

(21) Appl. No.: 15/482,378

(22) Filed: Apr. 7, 2017

(65) Prior Publication Data
US 2018/0138544 A1   May 17, 2018

(30) Foreign Application Priority Data
Nov. 16, 2016   (KR) .................. 10-2016-0152477

(51) Int. Cl.
*C03C 3/32* (2006.01)
*C03C 4/14* (2006.01)
*H01B 1/10* (2006.01)
*C03C 10/00* (2006.01)
*C04B 35/547* (2006.01)
*H01M 10/052* (2010.01)
*H01M 10/0562* (2010.01)

(52) U.S. Cl.
CPC ......... *H01M 10/0562* (2013.01); *C03C 3/321* (2013.01); *C03C 4/14* (2013.01); *C03C 10/00* (2013.01); *C04B 35/547* (2013.01); *H01B 1/10* (2013.01); *H01M 10/052* (2013.01); *C04B 2235/446* (2013.01); *C04B 2235/6567* (2013.01); *H01M 2300/002* (2013.01); *H01M 2300/0068* (2013.01); *Y02T 10/7011* (2013.01)

(58) Field of Classification Search
CPC .................. H01M 10/0562; C01B 35/547
See application file for complete search history.

(56) References Cited

U.S. PATENT DOCUMENTS

2007/0048617 A1   3/2007 Inda
2009/0159839 A1   6/2009 Seino et al.
(Continued)

FOREIGN PATENT DOCUMENTS

JP   5741653 B2   7/2015
KR   20080069236 A   7/2008
(Continued)

OTHER PUBLICATIONS

Nishio, Yusuke et al. "All-solid-state lithium secondary batteries using nanocomposites of NiS electrode/Li2S—P2S5 electrolyte prepared via mechanochemical reaction," Journal of Power Sources 189 (2009), pp. 629-632.

*Primary Examiner* — Matthew J Merkling
(74) *Attorney, Agent, or Firm* — Slater Matsil, LLP

(57) ABSTRACT

A method of manufacturing a sulfide-based solid electrolyte through a wet process is provided. The method includes preparing a slurry by adding a solvent to a mixture including lithium sulfide and a sulfide of a group 14 or group 15 element and amorphizing the mixture by milling the slurry. The slurry is dried in order to remove the solvent. The dried mixture is crystallized by heat-treating to form the sulfide-based solid electrolyte.

18 Claims, 4 Drawing Sheets

(56) References Cited

U.S. PATENT DOCUMENTS

| | | |
|---|---|---|
| 2011/0049745 A1 | 3/2011 | Katayama et al. |
| 2014/0004257 A1 | 1/2014 | Kubo et al. |
| 2015/0014581 A1 | 1/2015 | Kawakami et al. |
| 2015/0171464 A1 | 6/2015 | Kambara et al. |
| 2015/0318569 A1 | 11/2015 | Yanagi et al. |
| 2016/0104916 A1 | 4/2016 | Seino et al. |
| 2016/0190637 A1 | 6/2016 | Sugiura et al. |
| 2017/0062808 A1* | 3/2017 | Oishi .................. H01M 4/1397 |

FOREIGN PATENT DOCUMENTS

| | | | |
|---|---|---|---|
| KR | 100884598 B1 | 2/2009 | |
| KR | 20130130820 A | 12/2013 | |
| WO | WO-2015029614 A1 * | 3/2015 | ............... H01B 1/10 |

* cited by examiner

METHOD OF MANUFACTURING SULFIDE-BASED SOLID ELECTROLYTE THROUGH WET PROCESS

CROSS-REFERENCE TO RELATED APPLICATIONS

This application claims under 35 U.S.C. § 119(a) the benefit of Korean Patent Application No. 10-2016-0152477 filed on Nov. 16, 2016, the entire contents of which are incorporated herein by reference.

TECHNICAL FIELD

The present disclosure relates to a method of manufacturing a sulfide-based solid electrolyte through a wet process.

BACKGROUND

Today, secondary batteries have been widely used from large devices such as a vehicle and a power storage system to small devices such as a mobile phone, a camcorder, and a laptop.

As the application field of the secondary batteries becomes wider, the demand for improved safety and high performance of the battery has been increased.

A lithium secondary battery which is one of the secondary batteries has an advantage that energy density is higher and a capacity per unit area is larger than a nickel-manganese battery or a nickel-cadmium battery.

However, most of the electrolytes used in the lithium secondary batteries in the related art are liquid electrolytes such as organic solvents. Accordingly, safety problems such as leakage of electrolytes and the risk of fire resulting therefrom have been constantly raised.

As a result, recently, to increase safety, an interest in all-solid-state batteries using solid electrolytes rather than liquid electrolytes as the electrolytes has been increased.

The solid electrolyte has higher safety than the liquid electrolyte due to a non-combustible or flame-retardant property.

The solid electrolytes are divided into an oxide-based electrolyte and a sulfide-based electrolyte. The sulfide-based solid electrolyte has high lithium-ionic conductivity compared to the oxide-based solid electrolyte and is stable in a wide voltage range and thus the sulfide-based solid electrolyte is frequently used.

In Korean Patent Application Publication No. 10-2008-0069236, there is disclosed a manufacturing method of a sulfide-based solid electrolyte in which lithium sulfide and diphosphorus pentasulfide are milled for a predetermined time by a mechanical milling method to obtain sulfide glass and then the sulfide glass is heat-treated. In the manufacturing of a sulfide-based solid electrolyte through a dry process, there are problems below.

The mechanical milling in the dry state is performed for hours while materials sensitive to oxygen and moisture such as lithium sulfide and diphosphorus pentasulfide are exposed outside for a long time, and thus a physical property of the sulfide-based solid electrolyte as the final material deteriorates.

Since the materials are easily cohered on the wall surface of the container used in the mechanical milling, physical energy is not evenly applied to the materials and thus a difference in amorphization between sulfide-based solid electrolyte particles (powder) is caused, and further, the physical properties of the sulfide-based solid electrolyte become nonuniform during crystallization through heat-treatment.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to solve the above-described problems associated with prior art.

An object of the present invention is to provide a method of manufacturing a sulfide-based solid electrolyte through a wet process.

Another object of the present invention is to provide a method suitable for mass-producing a sulfide-based solid electrolyte.

Still another object of the present invention is to provide a method of manufacturing a high-ionic conductive sulfide-based solid electrolyte.

The objects of the present invention are not limited to the objects described above. The objects of the present invention will be more apparent in the description below and implemented by means described in the claims and a combination thereof.

The present invention may include the following configurations in order to achieve the above objects.

In one aspect, the present invention provides a manufacturing method of a sulfide-based solid electrolyte through a wet process, including: (S1) preparing slurry by adding a solvent to a mixture including lithium sulfide; and sulfide of a group 14 or group 15 element; (S2) amorphizing the mixture by milling the slurry; (S3) drying the slurry in order to remove the solvent; and (S4) crystallizing the dried mixture by heat-treating.

In a preferred embodiment, the lithium sulfide may be $Li_2S$ and the sulfide of the group 14 or group 15 element may be at least one of $P_2S_3$, $P_2S_5$, $SiS_2$, $GeS_2$, $As_2S_3$ and $Sb_2S_3$.

In another preferred embodiment, the mixture may include 60 mol % to 90 mol % of the lithium sulfide; and 10 mol % to 40 mol % of the sulfide of the group 14 or group 15 element.

In still another preferred embodiment, in step (S1), nickel sulfide may be further mixed to the mixture.

In yet another preferred embodiment, the nickel sulfide may be at least one of $Ni_3S_2$, NiS and $NiS_2$.

In still yet another preferred embodiment, the mixture may include 60 mol % to 80 mol % of the lithium sulfide; 10 mol % to 32 mol % of the sulfide of the group 14 or group 15 element; and 4 mol % to 20 mol % of nickel sulfide.

In a further preferred embodiment, the solvent may be selected from a group consisting of at least one hydrocarbon-based solvent of pentane, hexane, 2-ethyl hexane, heptane, octane, cyclohexane, and methyl cyclohexane; at least one BTX-based solvent of benzene, toluene, xylene, and ethylbenzene; at least one ether-based solvent of diethyl ether, tetrahydrofuran and 1,4-dioxane; at least one ester-based solvent of ethyl propionate and propyl propionate; or a mixed solvent thereof.

In another further preferred embodiment, in step (S1), the solvent may be added to the mixture so that a solid content of the slurry is 10 wt % to is wt %.

In still another further preferred embodiment, the amorphizing in step (S2) may be performed by milling the slurry under conditions of 300 RPM to 800 RPM and 4 hrs to 40 hrs by using a planetary mill.

In yet another further preferred embodiment, step (S3) may include a step of primarily drying the slurry in a vacuum state for 10 mins to 20 hrs at 25° C. to 60° C. and secondarily drying the slurry under the following conditions (a) a temperature higher than a melting point (° C.) of the solvent, (b) a temperature lower than a crystallization temperature (° C.) of the amorphized mixture, and (c) 10 mins to 4 hrs.

In still yet another further preferred embodiment, the secondary dry may be performed under a condition of 130° C. to 190° C.

In a still further preferred embodiment, in step (S3), the residue of the solvent may become more than 0 wt % and equal to or less than 5 wt % by drying the slurry.

In a yet still further preferred embodiment, in step (S4), the mixture may be heat-treated and crystallized under conditions of 200° C. to 500° C. and 30 mins to 10 hrs.

According to the manufacturing method of the sulfide-based solid electrolyte of the present invention, it is possible to protect a material from contacting the outside and evenly transfer physical energy to the material in a milling process. Accordingly, it is possible to obtain the sulfide-based solid electrolyte having a low deviation between physical properties due to excellent reproducibility. It is shown that the method is the manufacturing method suitable for mass-production of the sulfide-based solid electrolyte.

It is also possible to manufacture the sulfide-based solid electrolyte having lithium ion conductivity equal to or greater than the related art.

The effects of the present invention are not limited to the aforementioned effects. It should be understood that the effects of the present invention include all effects inferable from the description below.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
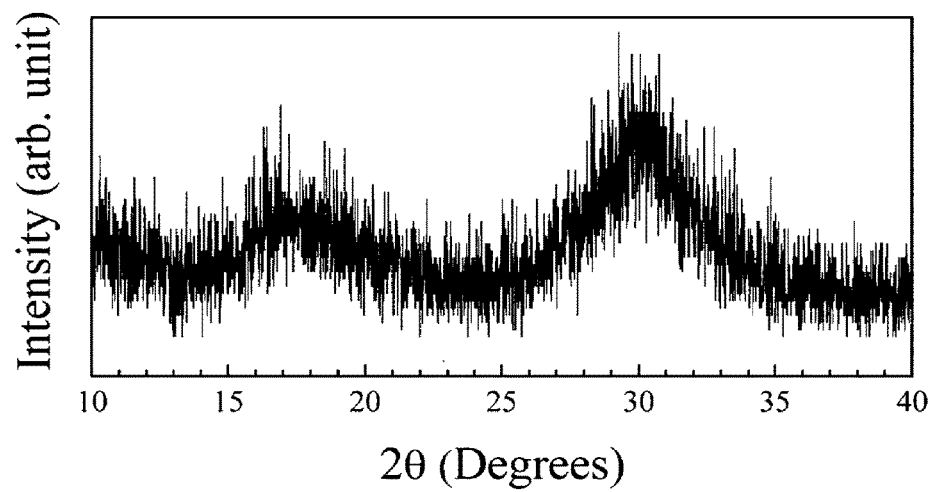
FIG. 1 is an X-ray diffraction spectroscopy (XRD) result for a mixture included in amorphized slurry in the following Example.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF ILLUSTRATIVE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, the present invention will be described in more detail through exemplary embodiments. The exemplary embodiments of the present invention may be modified in various forms as long as the gist of the invention is not changed. However, the scope of the present invention is not limited to the following exemplary embodiments.

When it is determined that the description for the known configurations and functions may obscure the gist of the present invention, the description for the known configurations and functions will be omitted. In this specification, the term "comprise" means that other constituent elements may be further included unless otherwise listed.

Figure 5:
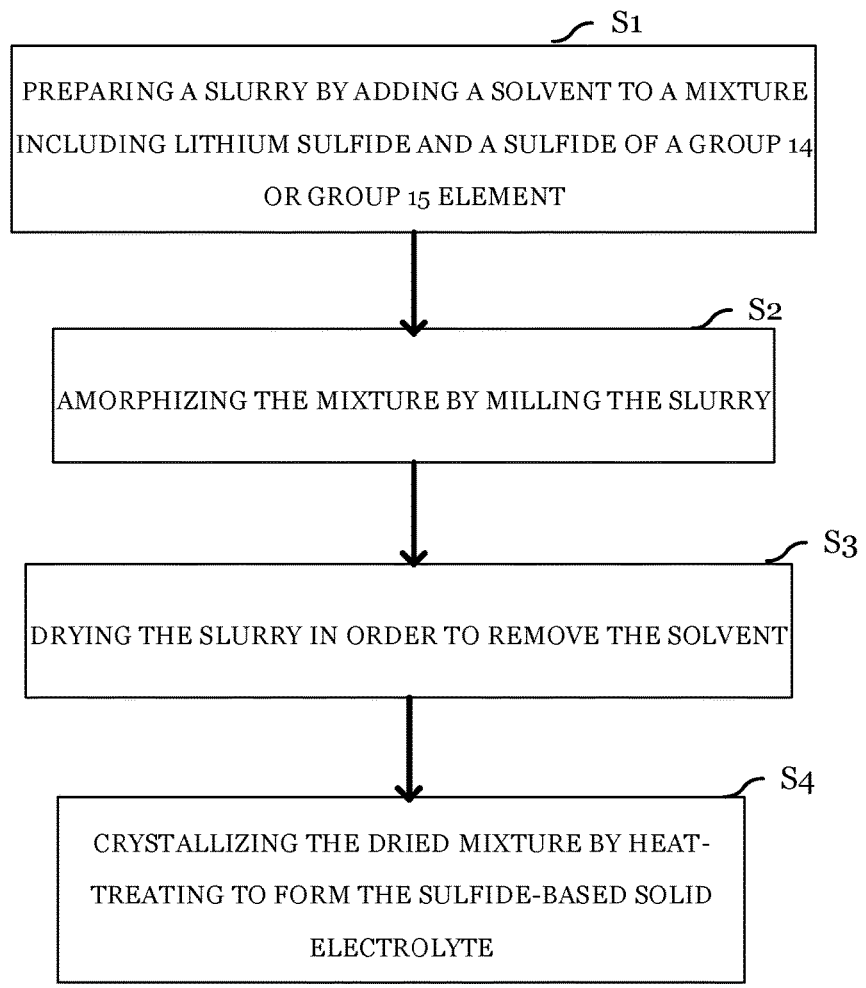
FIG. 5 illustrates a method of manufacturing the solid-state battery's solid-state electrolyte using a wet process in accordance with embodiments of the present invention.

Referring to FIG. 5, a manufacturing method of a sulfide-based solid electrolyte according to the present invention may include (S1) preparing slurry by adding a solvent to a mixture including lithium sulfide and sulfide of a group 14 or group 15 element, (S2) amorphizing the mixture by milling the slurry, (S3) drying the slurry in order to remove the solvent, and (S4) heat-treating and crystallizing the dried mixture. Hereinafter, embodiments of the present invention will be described in detail.

The lithium sulfide may use $Li_2S$. The sulfide of the group 14 or group 15 element may use at least one of $P_2S_3$, $P_2S_5$, $SiS_2$, $GeS_2$, $As_2S_3$ and $Sb_2S_3$, preferably $P_2S_5$, and the reason is that it is advantageous in formation of amorphous phase and a sulfide-based solid electrolyte having high lithium-ionic conductivity can be obtained.

The lithium sulfide and the sulfide of the group 14 or group 15 element are not particularly limited and may use sulfide which is industrially available or synthesized by the method in the related art, and may use sulfide having high purity.

The mixture in step (S1) may include 60 mol % to 90 mol % of the lithium sulfide, and 10 mol % to 40 mol % of the sulfide of the group 14 or group 15 element. When the composition of the mixture is as above, a crystal structure of the sulfide-based solid electrolyte may become a high-ionic conductive THIO-LISICON-like phase.

According to an embodiment of the present invention, a sulfide-based solid electrolyte containing a nickel (Ni) element may be manufactured by mixing lithium sulfide, sulfide of a group 14 or group 15 element, and nickel sulfide in step (S1).

The nickel sulfide may use at least one of $Ni_3S_2$, NiS and $NiS_2$. The nickel sulfide is not particularly limited and may use nickel sulfide which is industrially available or synthesized by a conventional method, and may use nickel sulfide having high purity.

The sulfide-based solid electrolyte containing the nickel (Ni) element has high lithium-ionic conductivity due to a crystal structure formed with nickel (Ni). The sulfide-based solid electrolyte has a specific crystal structure according to binding of each element and it is estimated that the lithium ions move by a hopping method through a gap in the crystal structure. Accordingly, as van der Waals radius of the element forming the gap in the crystal structure is decreased, it is advantageous in movement of lithium ions. A van der Waals radius of an element mainly including the sulfide-based solid electrolyte in the related art is: phosphorus (180 pm), sulfur (180 pm), tin (217 pm), silicon (210 pm), arsenic (185 pm).

Meanwhile, since the van der Waals radius of nickel is 163 pm and very small compared to the above elements, when nickel is included in the crystal structure, the lithium ions may smoothly pass through the gap.

The sulfide-based solid electrolyte containing a nickel (Ni) element has excellent stability. This may be described according to a principle of hard and soft acids and bases (HSAB). Since sulfur (S) is a weak base and phosphorus (P) is a strong acid, sulfur (S) and phosphorus (P) are not stably bound to each other. As a result, when nickel (Ni) which is an intermediate acid with weaker acidity than phosphorus (P) is included in a crystal phase, nickel (Ni) has better reactivity than phosphorus (P) which is a weak base and higher stability during binding.

An embodiment of the present invention may be a manufacturing method of a sulfide-based solid electrolyte containing a nickel (Ni) element by using a mixture including 60 mol % to 80 mol % of the lithium sulfide, 10 mol % to 32 mol % of the sulfide of the group 14 or group 15 element, and 4 mol % to 20 mol % of nickel sulfide as a starting material. When the composition of the mixture is as above, the nickel element is included in the crystal structure of the sulfide-based solid electrolyte such that the aforementioned effect can be expected.

The solvent may be any one selected from a group consisting of at least one hydrocarbon-based solvent of pentane, hexane, 2-ethyl hexane, heptane, octane, cyclohexane, and methyl cyclohexane; at least one BTX-based solvent of benzene, toluene, xylene, and ethylbenzene; at least one ether-based solvent of diethyl ether, tetrahydrofuran and 1,4-dioxane; and at least one ester-based solvent of ethyl propionate and propyl propionate, or a mixed solvent thereof.

An added amount of the solvent may vary according to a kind of solvent, but the solvent may be added so that a solid content is 5 wt % to 15 wt %, preferably 7 wt % to 15 wt %, and more preferably 10 wt % to 15 wt % when manufacturing the slurry by considering yield of the obtained sulfide-based solid electrolyte compared with the added mixture.

In this specification, the "solid content" means a remaining solid material except for the solvent in the slurry obtained by mixing the mixture and the solvent. The solid content may be controlled by a weight (g) of the mixture and a weight (g) of the solvent.

Step (S2) is a step of milling and amorphizing the slurry obtained through the above step. Particularly, the amorphizing may be milling the slurry under conditions of 300 RPM to 800 RPM and 4 hrs to 40 hrs by using a planetary mill.

The milling through the planetary mill may be performed by injecting zirconia ($ZrO_2$) balls into the slurry. The zirconia balls may be used with a single size or different sizes and the zirconia balls with different sizes may be used in order to maximize a mixing and milling effect.

The zirconia balls may be injected with an amount of 100 parts by weight to 10,000 parts by weight with respect of 100 parts by weight of the mixture. When the injected amount of the zirconia balls is too small, a time required for amorphizing may be very increased, and when the amount thereof is too large, the lack of a milling space in the container may rather interfere with the amorphization.

Step (S2) is performed with respect to the slurry including the solvent and is a step of milling (wet milling) in a wet state. Accordingly, as compared with milling (dry milling) in a dry state (state without the solvent), the wet milling has the following advantages.

In the wet milling, lithium sulfide, phosphorus sulfide, and the like which react with moisture, oxygen, or the like exist in the solvent and thus do not react, but stably exist. Further, even after the amorphizing ends, the contact with the outside is blocked and thus it is advantageous in storage.

In the wet milling, since a sticking phenomenon on the wall surface of the container and the like generated in the dry milling is not generated, physical energy for milling is evenly applied to the mixture. Accordingly, a deviation in physical properties of the sulfide-based solid electrolyte is decreased.

Since part of the solvent remains between particles during crystallization through heat-treatment after the amorphizing ends, less cohesion occurs compared to the dry-milled mixture. However, when the residue of the solvent is too large during crystallization through heat treatment, the formation of the crystal structure is disturbed and thus lithium-ionic conductivity of the sulfide-based solid electrolyte may be lowered. As a result, in the present invention, as such, the mixture is amorphized through wet milling and a drying step of removing the solvent below is a technical feature.

Step (S3) is a step of drying the slurry in order to remove the remaining solvent after the amorphizing ends.

In the amorphizing step, since some elements of the mixture are eluted with the solvent, when the mixture is heat-treated together with the solvent, some eluted elements are left in the sulfide-based solid electrolyte in a form of impurities and thus the lithium-ionic conductivity may be lowered.

Step (S3) may include primarily drying the slurry in a vacuum state for 10 mins to 20 hrs at 25° C. to 60° C. and secondarily drying the slurry under the following conditions: (a) a temperature higher than a melting point (° C.) of the solvent, (b) a temperature lower than a crystallization temperature (° C.) of the amorphized mixture, and (c) 10 mins to 20 hrs.

The primary drying is to remove a supernatant after the slurry is left for a long time after the amorphizing ends. In the case of using a filtering device and the like for removing the supernatant, a filter of the filtering device may contact the amorphized mixture, and in the case of using a dropping pipette and the like, the mixture may be removed together and it is difficult to remove the solvent in the mixture. Accordingly, the primary drying may be performed by vacuum drying.

The secondary drying is to remove the remaining solvent of the slurry after the primary drying. Preferably, the secondary drying may be performed by low-temperature drying under the conditions of (a) to (c), and the low-temperature drying may be performed at a temperature which is higher than a melting point of the solvent and lower than a crystallization temperature of the amorphized mixture for 10 mins to 20 hrs.

The remaining solvent in the solid electrolyte is removed by heating the solid electrolyte at the temperature or more by considering the melting point of the solvent. The reason is that the powder on the surface of the electrolyte is dried by the primary drying, but the remaining solvent in the powder in the electrolyte is not sufficiently removed. The secondary drying may be performed at a temperature of 130° C. to 190° C., and when the temperature is too low, a dry time is increased and it may be difficult to fully remove the solvent and when the temperature is more than 190° C., crystallization of the solid electrolyte may be performed. Generally, a $Li_2S$—$P_2S_5$-based solid electrolyte has a crystallization temperature of 200° C. to 270° C. and a $Li_2S$—$P_2S_5$-$Ni_3S_2$-based solid electrolyte has a crystallization temperature within 260° C. In the case of crystallizing the amorphized solid electrolyte together with the remaining solvent while the solvent is not sufficiently removed, the physical property of the solid electrolyte largely deteriorates and the desired lithium-ionic conductivity may not be ensured, and thus the secondary dry may be performed under the above conditions.

Step (3) may be a step in which the residue of the solvent becomes more than 0 wt % and equal to or less than 5 wt % by drying the slurry through the primary dry and the secondary dry. When the residue of the solvent is more than 5 wt %, impurities are formed by some elements eluted in the solvent and thus lithium-ionic conductivity of the sulfide-based solid electrolyte may be lowered.

Step (S3) may be performed through hot vacuum dry by changing a dry process.

Step (S4) may be a step of heat-treating and crystallizing the mixture after drying. In detail, the crystallization may be heat-treating the mixture under conditions of 200° C. to 500° C. and 30 mins to 100 hrs.

The sulfide-based solid electrolyte may be obtained through step (S4). After step (S4), removing a small amount of remaining solvent on the surface of the sulfide-based solid electrolyte through vacuum drying may be further performed.

Hereinafter, the present invention will be described in more detail through detailed Examples. However, these Examples are to exemplify the present invention and the scope of the present invention is not limited thereto.

EXAMPLES

The following examples illustrate the invention and are not intended to limit the same.

(1) $Li_2S$ as lithium sulfide, $P_2S_5$ as sulfide of a group 14 or group 15 element, $Ni_3S_2$ as nickel sulfide, and xylene as a solvent were used. $Li_2S$:$P_2S_5$:$Ni_3S_2$ was measured by a composition ratio of 90 mol :30 mol:10 mol to prepare a mixture of 45 g. Xylene was added to the mixture to prepare slurry. In this case, xylene was added such that a solid content of the slurry is 10 wt %.

(2) The slurry was injected into a container of 1,000 cc of a planetary ball mill together with 2,300 g of zirconia balls. The slurry was amorphized by milling for 20 hrs.

(3) The slurry was vacuum-dried (primarily dried) for about 30 mins at room temperature and subsequently low-temperature dried (secondarily dried) for 2 hrs at 160° C. to remove the solvent.

(4) The dried mixture was crystallized by heat-treating for 2 hrs at 260° C. to obtain a sulfide-based solid electrolyte containing a nickel (Ni) element.

Comparative Example 1

Except for performing only the primary drying without the secondary drying in step (S3) in Example, a sulfide-based solid electrolyte containing a nickel (Ni) element was manufactured by the same method as Example.

Comparative Example 2

(i) $Li_2S$:$P_2S_5$:$Ni_3S_2$ was measured by a composition ratio of 90 mol:30 mol:10 mol to prepare a mixture of 45 g.

(2) The mixture was injected into a container of 1,000 cc of a planetary ball mill together with 2,300 g of zirconia balls. The mixture was amorphized by milling for 20 hrs.

(3) The amorphized mixture was crystallized by heat-treating for 2 hrs at 260° C. to obtain a sulfide-based solid electrolyte containing a nickel (Ni) element.

Evaluation of Physical Properties
(Amorphization Evaluation of Example)

In manufacturing the sulfide-based solid electrolyte according to Example, when a solvent (xylene) was added so that the solid content of the slurry becomes 10 wt %, whether the mixture was amorphized through wet milling was evaluated. To this end, an X-ray diffraction spectroscopy (XRD) for the mixture included in the amorphized slurry was performed. The result is illustrated in FIG. 1.

Referring to FIG. 1, it can be verified that there is no peak of $Li_2S$, $P_2S_5$, and $Ni_3S_2$ as starting materials. Therefore, according to the present invention, it can be seen that the mixture may be effectively amorphized by wet milling.
(Evaluation of Solvent Residue and Resistance in Example and Comparative Example 1)

When manufacturing the sulfide-based solid electrolyte according to Example and Comparative Example 1, a solvent residue after the drying step and electric resistance of the sulfide-based solid electrolyte according to the solvent residue were evaluated.

Figure 2:
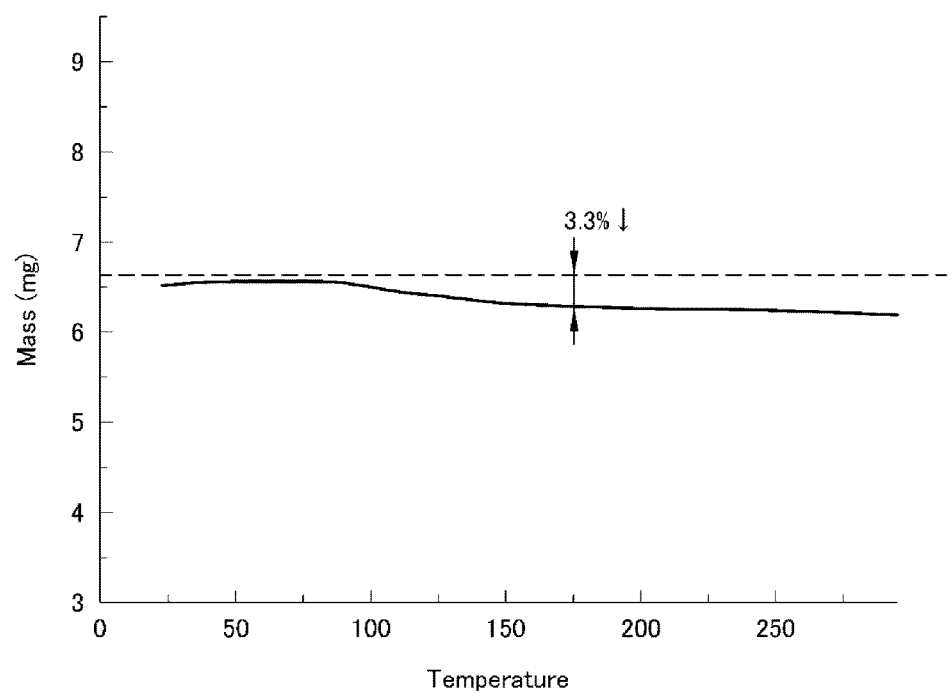
FIG. 2 is a result of measuring a difference in mass between just before heat treatment and after heat treatment of the dried mixture in the following Example in order to evaluate a solvent residue.

The solvent residue was measured by a difference in mass between just before heat-treatment and after heat-treatment of the mixture. FIG. 2 is a result for the sulfide-based solid electrolyte in Example and FIG. 3 is a result for the sulfide-based solid electrolyte in Comparative Example 1.

Referring to FIG. 2, in Example, a mass reduction of about 3.3 wt % after heat-treating is measured, and it can be seen that the solvent residue of the slurry after primary drying and secondary drying is 3.3 wt %.

Figure 3:
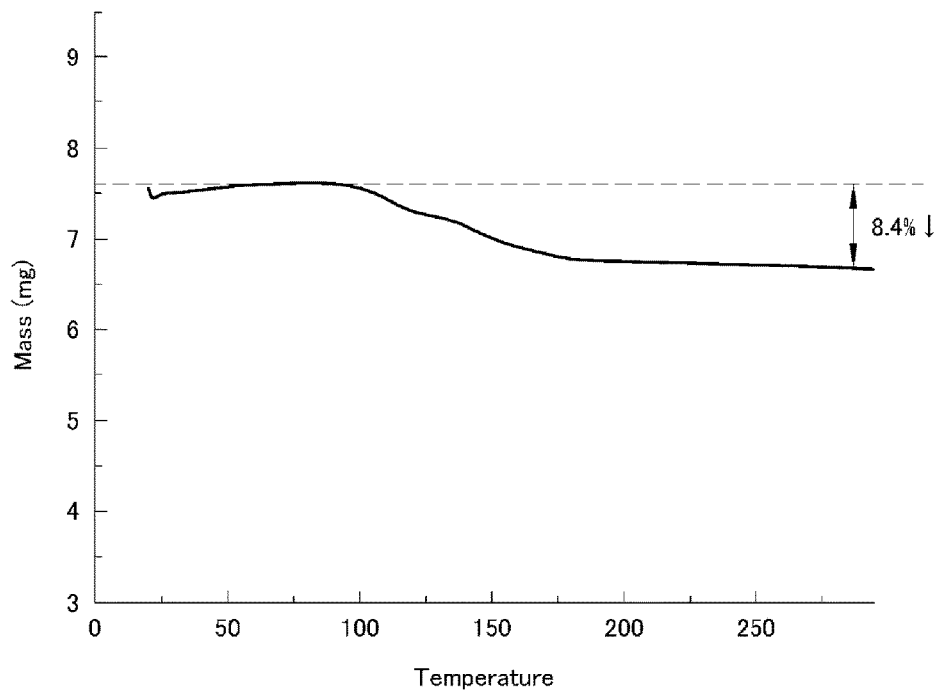
FIG. 3 is a result of measuring a difference in mass between just before heat treatment and after heat treatment of the dried mixture in the following Comparative Example 1 in order to evaluate a solvent residue.

On the contrary, referring to FIG. 3, in Comparative Example 1, a mass reduction of about 8.4 wt % after heat-treating is measured, and it can be seen that in the case of performing only the primary drying, the solvent residue of the slurry is about 8.4 wt %.

The sulfide-based solid electrolytes in Example and Comparative Example 1 were compressively molded, respectively, to form a molding body for measuring (with a diameter of 13 mm). An AC (alternating current) potential of 10 mV was applied to the molding body and then electric resistance was measured by performing a frequency sweeping of $1\times10^6$ to 100 Hz. The result is illustrated in FIG. 4.

Figure 4:
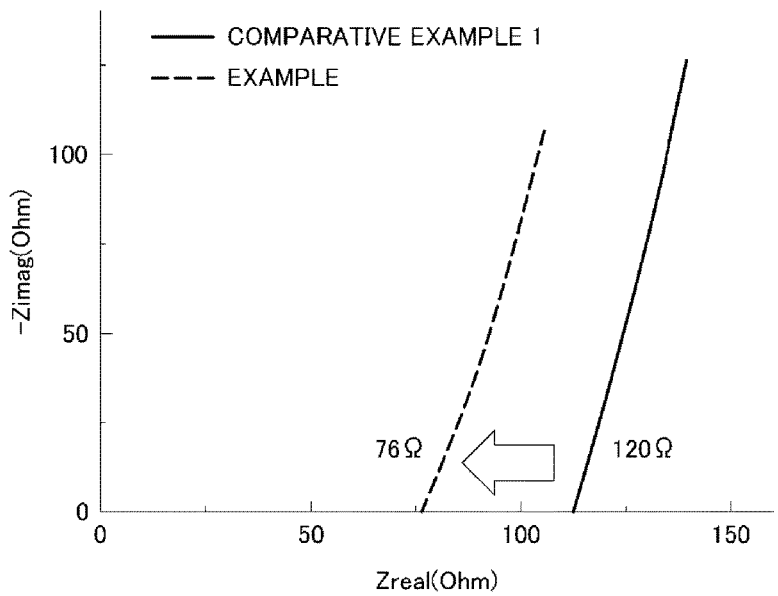
FIG. 4 is a result of measuring electrical resistance of the sulfide-based solid electrolyte in the following Example and Comparative Example 1.

Referring to FIG. 4, it can be verified that the electric resistance of the sulfide-based solid electrolyte in Example is about 76 Ω and significantly lower than about 120 Ω that is the electric resistance of the sulfide-based solid electrolyte in Comparative Example 1. The reason is that in Example, the solvent residue is small and thus a lot of impurities are not generated and the crystal structure is formed well. As a result, when a solid electrolyte layer of a battery is formed by the sulfide-based solid electrolyte in Example, lithium ions are easily diffused and thus the capacity and service life of the battery can be improved.

(Measurement of Lithium-Ionic Conductivity of Example, Comparative Example 1, and Comparative Example 2)

Lithium-ion conductivities of the sulfide-based solid electrolytes according to Example, Comparative Example 1, and Comparative Example 2 were measured. Each sulfide-based solid electrolyte was compressively molded to form a molding body for measuring (with a diameter of 13 mm and a thickness of 0.6 mm). An AC potential of 10 mV was applied to the molding body and then an impedance value was measured by performing a frequency sweeping of $1\times10^6$ to 100 Hz to obtain lithium-ionic conductivity.

The result is illustrated in Table 1 below.

TABLE 1

| Classification | Milling method | Drying method | Lithium-ionic conductivity |
|---|---|---|---|
| Example | Wet milling | Vacuum drying and low-temperature drying | $1.12 \times 10^{-3}$ S/cm |
| Comparative Example 1 | Wet milling | Vacuum drying | $5.62 \times 10^{-5}$ S/cm |
| Comparative Example 2 | Dry milling | — | $1.00 \times 10^{-4}$ S/cm |

Referring to Table 1, it can be seen that the lithium-ionic conductivity of the sulfide-based solid electrolyte obtained by the manufacturing method according to the present invention is measured to be highest.

According to the manufacturing method of the sulfide-based solid electrolyte of the present invention, it is possible to protect a material from contacting the outside and evenly transfer physical energy to the material in a milling process. Therefore, the sulfide-based solid electrolyte with a small deviation between the physical properties may be obtained and thus the manufacturing method may be suitable for mass production.

According to the present invention, the solvent residue is decreased through continuous primary drying and secondary drying to prevent generation of impurities derived from some elements eluted in the solvent. Therefore, the crystal structure is smoothly formed to manufacture the sulfide-based solid electrolyte with lithium-ionic conductivity which is significantly improved compared to the related art.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of manufacturing a sulfide-based solid electrolyte through a wet process, the method comprising:
   preparing a slurry by adding a solvent to a mixture including lithium sulfide and a sulfide of a group 14 or group 15 element, wherein preparing the slurry further comprises mixing nickel sulfide to the mixture, wherein the nickel sulfide comprises $Ni_3S_2$, NiS, or $NiS_2$, and wherein the mixture includes 60 mol % to 80 mol % of the lithium sulfide, 10 mol % to 32 mol % of the sulfide of the group 14 or group 15 element, and 4 mol % to 20 mol % of the nickel sulfide;
   amorphizing the mixture by milling the slurry;
   drying the slurry in order to remove the solvent to form a dried mixture, wherein the drying of the slurry comprises primarily drying the slurry in a vacuum state for 10 mins to 20 hrs at 25° C. to 60° C.: and secondary drying the slurry, wherein the secondary drying is performed at a secondary drying temperature, wherein the secondary drying temperature is higher than a melting point of the solvent, lower than a crystallization temperature of the amorphized mixture, and between 130° C. and 190° C., and wherein the secondary drying is performed for a time between 10 mins and 4 hrs; and
   crystallizing the dried mixture by heat-treating to form the sulfide-based solid electrolyte.

2. The method of claim 1, wherein the lithium sulfide is $Li_2S$ and the sulfide of the group 14 or group 15 element is at least one of $P_2S_3$, $P_2S_5$, $SiS_2$, $GeS_2$, $As_2S_3$ and $Sb_2S_3$.

3. The method of claim 1, wherein the solvent is selected from a group consisting of
   at least one hydrocarbon-based solvent of pentane, hexane, 2-ethyl hexane, heptane, octane, cyclohexane, and methyl cyclohexane;
   at least one BTX-based solvent of benzene, toluene, xylene, and ethylbenzene;
   at least one ether-based solvent of diethyl ether, tetrahydrofuran, and 1,4-dioxane;
   at least one ester-based solvent of ethyl propionate and propyl propionate; or
   a mixed solvent thereof.

4. The method of claim 1, wherein the solvent is added to the mixture so that a solid content of the slurry is 10 wt % to 15 wt %.

5. The method of claim 1, wherein the amorphizing is performed by milling the slurry under conditions of 300 RPM to 800 RPM and 4 hrs to 40 hrs by using planetary mill.

6. The method of claim 1, wherein the residue of the solvent becomes more than 0 wt % and equal to or less than 5 wt % by drying the slurry.

7. The method of claim 1, wherein the heat-treating is performed under conditions of 200° C. to 500° C. and 30 mins to 10 hrs.

8. A method of manufacturing a solid-state battery, the method comprising:
   preparing a mixture including lithium sulfide and a sulfide of a group 14 or group 15 element;
   preparing a slurry by adding a solvent to the mixture, wherein preparing the slurry further comprises mixing nickel sulfide to the mixture, wherein the nickel sulfide comprises $Ni_3S_2$, NiS, or $NiS_2$, wherein the mixture includes 60 mol % to 80 mol % of the lithium sulfide, 10 mol % to 32 mol % of the sulfide of the group 14 or group 15 element, and 4 mol % to 20 mol% of nickel sulfide;

milling the slurry to amorphize the mixture;

forming a dried mixture by removing the solvent from the slurry using a drying process, wherein the drying process comprises primarily drying the slurry in a vacuum state for 10 mins to 20 hrs at 25° C. to 60° C.; and secondary drying the slurry, wherein the secondary drying is performed at a secondary drying temperature, wherein the secondary drying temperature is higher than a melting point of the solvent, lower than a crystallization temperature of the amorphized mixture, and between 130° C. and 190° C., and wherein the secondary drying is performed for a time between 10 mins and 4 hrs; and crystallizing the dried mixture by heat-treating to form a sulfide-based solid electrolyte of the solid-state battery.

9. The method of claim 8, wherein the milling comprises using a planetary mill.

10. The method of claim 9, wherein milling using the planetary mill is performed by injecting zirconia ($ZrO_2$) balls into the slurry.

11. The method of claim 8, wherein the lithium sulfide is $Li_2S$ and the sulfide of the group 14 or group 15 element is at least one of $P_2S_3$, $P_2S_5$, $SiS_2$, $GeS_2$, $As_2S_3$ and $Sb_2S_3$.

12. The method of claim 8, wherein the solvent added to the mixture comprises a solvent selected from a group consisting of:
a hydrocarbon-based solvent of pentane, hexane, 2-ethyl hexane, heptane, octane, cyclohexane, or methyl cyclohexane;
a BTX-based solvent of benzene, toluene, xylene, or ethylbenzene;
an ether-based solvent of diethyl ether, tetrahydrofuran, or 1,4-dioxane; and
an ester-based solvent of ethyl propionate or propyl propionate.

13. A method of manufacturing a lithium ion solid-state battery, the method comprising:
preparing a mixture including lithium sulfide and a sulfide comprising a group 14 or group 15 element;
preparing a slurry by adding a solvent to the mixture, wherein preparing the slurry further comprises mixing nickel sulfide to the mixture, wherein the nickel sulfide comprises $Ni_3S_2$, NiS, or $NiS_2$, wherein the mixture includes 60 mol % to 80 mol % of the lithium sulfide, 10 mol % to 32 mol % of the sulfide of the group 14 or group 15 element, and 4 mol % to 20 mol % of nickel sulfide;

milling the slurry to amorphize the mixture;

forming a dried mixture by removing the solvent from the slurry using a drying process, wherein the drying process comprises a first drying process and a second drying process, wherein the first drying process is performed in a vacuum at a first drying temperature between 25° C. and 60° C., wherein the first drying process is performed for a time between 10 mins to 20 hrs, wherein the second drying process is performed at a second drying temperature, wherein the second drying temperature is higher than a melting point of the solvent, lower than a crystallization temperature of the amorphized mixture, and between 130° C. and 190° C., and wherein the second drying process is performed for a time between 10 mins and 4 hrs; and crystallizing the dried mixture by heat-treating to form a sulfide-based solid electrolyte of the lithium ion solid-state battery.

14. The method of claim 13, wherein the milling is performed under conditions of 300 RPM to 800 RPM and 4 hrs to 40 hrs by using planetary mill.

15. The method of claim 13, wherein the milling comprises using a planetary mill.

16. The method of claim 15, wherein milling using the planetary mill is performed by injecting zirconia ($ZrO_2$) balls into the slurry.

17. The method of claim 13, wherein the lithium sulfide is $Li_2S$ and the sulfide of the group 14 or group 15 element is at least one of $P_2S_3$, $P_2S_5$, $SiS_2$, $GeS_2$, $As_2S_3$ and $Sb_2S_3$.

18. The method of claim 13, wherein the solvent added to the mixture comprises a solvent selected from a group consisting of:
a hydrocarbon-based solvent of pentane, hexane, 2-ethyl hexane, heptane, octane, cyclohexane, or methyl cyclohexane;
a BTX-based solvent of benzene, toluene, xylene, or ethylbenzene;
an ether-based solvent of diethyl ether, tetrahydrofuran, or 1,4-dioxane; and
an ester-based solvent of ethyl propionate or propyl propionate.

* * * * *